US011317263B2

(12) United States Patent
Elboim et al.

(10) Patent No.: US 11,317,263 B2
(45) Date of Patent: Apr. 26, 2022

(54) PACKAGE-LESS LOW ENERGY COMMUNICATION SYSTEM TAG

(71) Applicant: Wiliot, Ltd., Caesarea (IL)

(72) Inventors: Yaron Elboim, Haifa (IL); Eylon Gersten, Even Yehuda (IL)

(73) Assignee: Wiliot, Ltd., Caesarea (IL)

( * ) Notice: Subject to any disclaimer, the term of this patent is extended or adjusted under 35 U.S.C. 154(b) by 0 days.

(21) Appl. No.: 16/665,329

(22) Filed: Oct. 28, 2019

(65) Prior Publication Data

US 2020/0145804 A1 May 7, 2020

Related U.S. Application Data

(60) Provisional application No. 62/754,626, filed on Nov. 2, 2018.

(51) Int. Cl.
| | |
|---|---|
| *H04W 4/80* | (2018.01) |
| *H01Q 1/24* | (2006.01) |
| *H01Q 1/22* | (2006.01) |
| *H04L 29/08* | (2006.01) |
| *H04L 67/12* | (2022.01) |

(52) U.S. Cl.
CPC ............ *H04W 4/80* (2018.02); *H01Q 1/2291* (2013.01); *H01Q 1/248* (2013.01); *H04L 67/12* (2013.01)

(58) Field of Classification Search
CPC ....... H04W 4/80; H01Q 1/248; H01Q 1/2291; H01Q 1/38; H04L 67/12
See application file for complete search history.

(56) References Cited

U.S. PATENT DOCUMENTS

| | | | |
|---|---|---|---|
| 2011/0291816 A1* | 12/2011 | Kato | H01L 27/13 340/10.51 |
| 2014/0336474 A1* | 11/2014 | Arbabian | A61B 5/686 600/301 |
| 2017/0092897 A1* | 3/2017 | Liu | H01L 51/5256 |
| 2018/0183274 A1* | 6/2018 | Auten | H02J 50/23 |

* cited by examiner

*Primary Examiner* — Yuwen Pan
*Assistant Examiner* — Fatuma G Sherif
(74) *Attorney, Agent, or Firm* — M&B IP Analysts, LLC

(57) ABSTRACT

A low-energy communication system includes at least one antenna; an energy harvester coupled to the at least one antenna and adapted to harvest energy from over-the-air signals; a first capacitor for storing the harvested energy; a system on chip (SoC) for allowing at least reception and transmission of wireless signals using a low-energy communication protocol; and wherein the energy harvester, the first capacitor, the SoC, are integrated in a semiconductor die, the die is placed on a substrate; and wherein the at least one antenna is included in the substrate.

16 Claims, 5 Drawing Sheets

PACKAGE-LESS LOW ENERGY COMMUNICATION SYSTEM TAG

CROSS-REFERENCE TO RELATED APPLICATIONS

This application claims the benefit of U.S. Provisional Application No. 62/754,626 filed on Nov. 2, 2018 the contents of which are hereby incorporated by reference.

TECHNICAL FIELD

The present disclosure generally relates to an internet of thing (IoT) devices, and more specifically to a package-less implementation of such devices.

BACKGROUND

Bluetooth Low Energy (BLE) is a wireless personal area network technology designed and marketed by the Bluetooth Special Interest Group (Bluetooth® SIG), aimed at novel applications in the healthcare, fitness, beacons, security, and home entertainment industries. Compared to Classic Bluetooth®, Bluetooth Low Energy is intended to provide considerably reduced power consumption and costs while maintaining a similar communication range.

BLE technology is implemented in wireless communication devices, such as smart phones, tablet computers, and wearable devices operated using operating systems, such as iOS®, Android® and Windows® 10, that natively support Bluetooth Low Energy. BLE technologies is also implemented in Internet of Things (IoT) sensors or devices.

A typical BLE communication system includes a BLE microcontroller, a DC power source (e.g., a battery), power regulators, crystal oscillators, and an antenna. The BLE microcontroller typically combines programmable and reconfigurable analog and digital blocks combined to form a combination of a microcontroller with an integrated BLE radio system.

The form factor of the BLE microcontroller is a system on chip, where its components are integrated in a die. A die is a small block of semiconductor material on which a given functional circuit is fabricated. Typically, ICs are produced in large batches on a single wafer of semiconductor material through a process such as photolithography. The wafer is cut ("diced") into many pieces, each containing one copy of the circuit. Each of these pieces is called a die. In some configurations the BLE microcontroller's die is packaged, depending on the form factor of the BLE communication system.

The DC power source is typically a battery regulated by the power regulators. Such regulators both: provide local storage reservoirs and lower the effective impedance on the power supply. The crystal oscillator provides a clock reference signal to the BLE microcontroller. Such a clock signal is used by the BLE microcontroller to calibrate an oscillator. Specifically, the oscillator generates a radio frequency (RF) carrier signal that carries the data signal generated by the BLE microcontroller. The oscillator is typically a free-running oscillator, which may be used to directly generate an RF carrier signal. Thus, a free-running oscillator may replace a frequency synthesizer to generate an RF carrier signal. Utilization of a free-running oscillator may result in power savings. The free-running oscillator generates a RF carrier signal, having a frequency within a specific portion of the wireless spectrum, for example, the 2.4 GHz wireless band. Typically, the free running oscillator is locked via a phase-locked loop (PLL) to a clock, originating from a crystal oscillator.

The antenna is designed to receive and transmit wireless signals at the BLE frequency spectrum. The antenna may be a PCB-trace antenna or connected outside of the PCB, depending on the form factor of the BLE communication system.

There are two primary form factors for implementing a BLE communication system. One form factor, shown in FIG. 1, shows elements of a BLE communication system 100 mounted on a printed circuit board (PCB) 110. The elements of the system 100 include a power source 101, power regulators 102, a crystal oscillator 103, a BLE microcontroller 104, and an antenna 105. In this form factor, the BLE microcontroller 104 is packaged and coupled to the PCB 110 as a standalone chip. In addition, the antenna 105 is a PCB-trace antenna which is designed to enter the PCB 110 itself.

One of the disadvantages of such a form factor is its size, which is relatively big due to the PCB and the number of integrated elements. In addition, BLE communication systems implemented as shown in FIG. 1, are typically sold as separate cards, and thus do not provide the option of embedding external functionalities (e.g., sensors). In fact, it may be impractical to implement small-size BLE tags based on the form factor shown in FIG. 1.

Another form factor, shown in FIG. 2, shows elements of a BLE communication system 200 integrated in the same module or chip 210. Specifically, in this form factor, power regulators 202, a crystal oscillator 203, and a BLE microcontroller 204 are integrated in the same package (module) 210. The BLE microcontroller 204 is not packaged, but rather integrated in a semiconductor die. To minimize the size of the chip 210, the power source 201 and antenna 205 are connected outside of the package 200.

The size of the above system is relatively small in comparison to the PCB-type of form factor and, therefore, is easy to integrate with other products. However, the cost of chip-type implementation is expensive relative to the PCB-type and demonstrates high operational complexity due to the need to integrate and connect many electronic components into one function. This would further require complex configuration of the entire BLE system.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used hereinafter to refer to a single embodiment or multiple embodiments of the disclosure.

Certain embodiments disclosed herein include a low-energy communication system, comprising: at least one antenna; an energy harvester coupled to the at least one antenna and adapted to harvest energy from over-the-air signals; a first capacitor for storing the harvested energy; a system on chip (SoC) for allowing at least reception and transmission of wireless signals using a low-energy communication protocol; and wherein the energy harvester, the first capacitor, the SoC, are integrated in a semiconductor die, the die is placed on a substrate; and wherein the at least one antenna is included in the substrate.

Certain embodiments disclosed herein also include a battery-free internet of things (IoT) device, comprising: a die integrating functionality of a low-energy communication, wherein the die is placed on a substrate; at least one antenna connected to the die included on the substrate; and a sensor included on the substrate.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
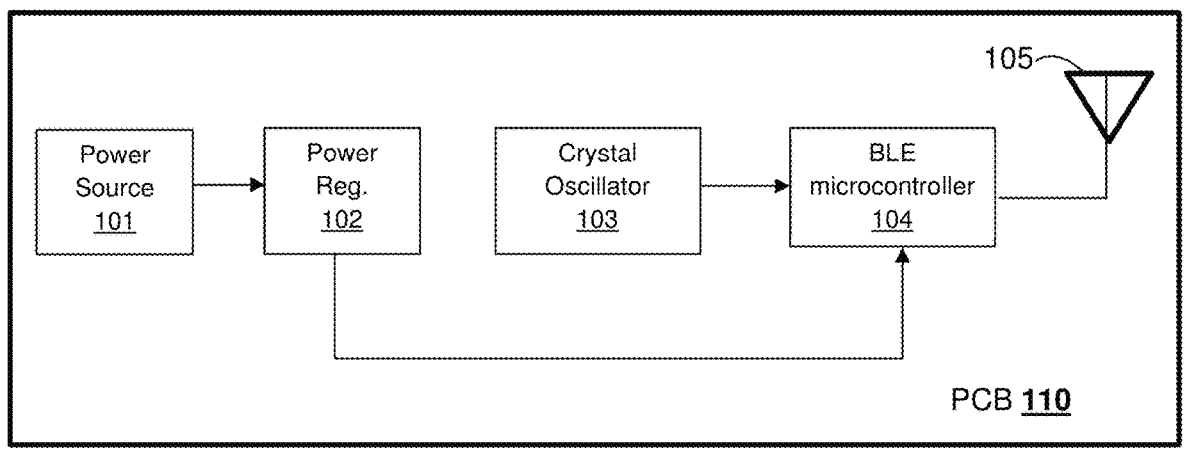
FIG. 1 illustrates a schematic diagram of conventional form factor of a BLE communication system mounted on a PCB.
Figure 2:
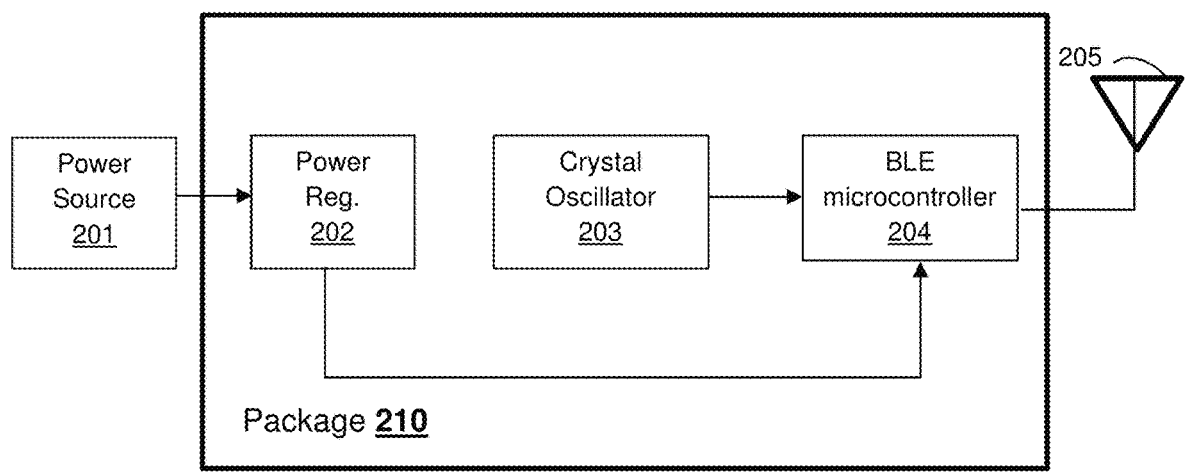
FIG. 2 illustrates a schematic diagram of conventional form factor of a BLE communication system integrated in a chip.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a low-energy communication system having an on-die package-less form factor is provided. The elements of the such communication system are integrated on a single die where the antenna is printed on a substrate. The die is glued to the substrate. The form factor for the low-energy communication system eliminates the need for many external interfaces and devices. Therefore, reduces the overall cost and size of the system. In an embodiment, the low-energy communication system is a BLE communication system.

Figure 3:
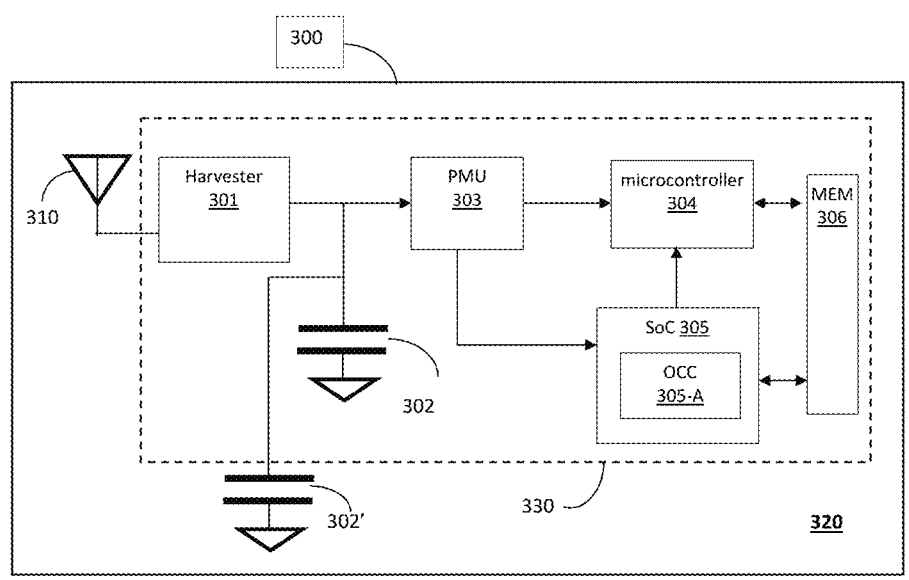
FIG. 3 illustrates a block diagram of a low-energy communication system designed according to the disclosed embodiments.

FIG. 3 shows an example schematic diagram of a low-energy communication system 300, designed according to the disclosed embodiments. The form factor of the system 300 is an on-die package-less. The communication system 300, as schematically demonstrated in FIG. 3, includes an energy harvester 301, coupled to an on-die capacitor 302, a power management unit (PMU) 303, a microcontroller 304, a system on chip (SoC) 305, and a retention memory 306. The communication system 300 further includes at least one antenna 310 glued to a substrate 320. In another embodiment, the antenna 310 may be printed on the substrate or etched to the substrate. In an embodiment, the substrate 320 is made of a low-cost material, such as, but not limited to, polyethylene (PET), polyimide (PI), and polystyrene (PS). In another embodiment, the substrate 320's pattern (layout) can be any of aluminum, copper, or silver. The glue utilized to glue to die and/or antenna 310 may be include materials such as an anisotropic conductive film (ACP), any type of conductive glue, solder past, and the like. Also shown in FIG. 3 is capacitor 302' which is an additional capacitor connected to the energy harvester and integrated on the substrate outside of the die.

In the embodiment shown in FIG. 3, the antenna 310 is coupled to the harvester 301 and may be utilized for energy harvesting as well as wireless communication. In some embodiments, multiple antennas may be utilized to harvest energy at multiple frequency bands. Other embodiments may include one or more antenna for energy harvesting and an antenna to receive/transmit wireless signals at the BLE frequency band.

The SoC 305 includes a number of execution functions realized as analog circuits, digital circuits, or both. Examples for such execution functions are provided below. The SoC 305 is also configured to carry out processes independently or under the control of the microcontroller 304. Each process carried out by the SoC 305 also has a state, and processes can communicate with other processes through an IPC protocol. In the configuration illustrated in FIG. 3, the SoC 305 and/or the microcontroller 304 loads the context of processes and read data from the retention memory 306.

The SoC 305 is partitioned into multiple power domains. Each power domain is a collection of gates powered by the same power and ground supply. To reduce the power consumption, only one power domain is turned on during execution. The SoC 305 can perform functions, such as reading from and writing to memory, e.g., of peripherals and can execute simple logic operations; tracking power level of the SoC 305; generating and preparing data packets for transmission; cyclic redundancy check (CRC) code generation; packet whitening; encrypting/decrypting of packets; converting data from parallel to serial; and staging the packet bits to the analog transmitter path for transmission.

In a preferred embodiment, the SoC 305 includes an oscillator calibration circuit (OCC) 305-A. The OCC 305-A includes at least one frequency locking circuit (FLC), each of which is coupled to an oscillator (both are not shown). The FLC calibrates the frequency of an oscillator using an over-the-air reference signal. In an embodiment, the calibration of the respective oscillator is performed immediately prior to a data transmission session and remains free running during the data transmission session. The FLC can be realized using frequency locked loop (FLL), a phased locked loop (PLL), and a delay locked loop (DLL). An example implementation of an oscillator calibration circuit 380 is discussed in U.S. patent application Ser. No. 15/994,388 to Yehezkely, assigned to the common assignee.

According to the disclosed embodiments, the energy harvester 301, the capacitor 302, PMU 303, microcontroller 304, SoC 305, and retention memory 307 are integrated in a die 330. The die 330 is glued to the substrate 320. The communication system 300 does not include any external DC power source, such as a battery.

In an embodiment, the microcontroller 304 implements electronic circuits (such as, memory, logic, RF, etc.) performing various functions allowing communication using a low energy (power) communication protocol. Examples for such a protocol includes, but are not limited to, Bluetooth®, LoRa, Wi-Gi®, nRF, DECT®, Zigbee®, Z-Wave, EnOcean, and the like. In a preferred embodiment, the microcontroller 304 operates using a Bluetooth Low energy (BLE) communication protocol.

In some embodiments, the microcontroller 304 is integrated with wireless sensors (not shown) to a complete an IoT device functionality. The sensors may include heart monitoring implants, biochip transponders on farm animals, automobiles with built-in sensors, automation of lighting, heating, ventilation, air conditioning (HVAC) systems, and appliances such as washer/dryers, robotic vacuums, air purifiers, ovens or refrigerators/freezers, and the like. The sensors may further include actuators.

The harvester 301 is configured to provide multiple voltage levels to the microcontroller 304, while maintaining a low loading DC dissipation value. In an example implementation, the energy harvester 301 may include a voltage multiplier coupled to the antenna 310. The voltage multiplier may be a Dickson multiplier, while the antenna is a 310 receive/transmit antenna of the microcontroller 304. That is, in such a configuration, the antenna is primarily designed to receive and/or transmit wireless signals according to the respective communication protocol of the low-energy communication system 300 (e.g., 2.400-2.4835 GHz signal for BLE communication).

It should be noted that the antenna 310 may also be designed for energy harvesting and may operate on a different frequency band, direction, or both, than those defined in the standard of the respective communication protocol. Regardless of the configuration, energy can be harvested from any wireless signals received over the air. Alternatively, energy can be harvested from any other sources, such as solar, piezoelectric signals, and the like.

The harvested energy is stored in the capacitor 302. According to the disclosed embodiments, the capacitor 302 is part of the die 301. In an example embodiment, the capacitor 302 is a metal capacitor form using the metal layers. An example implementation of an on-die capacitor is discussed in U.S. Provisional application Ser. No. 16/523, 015 to Elboim, assigned to the common assignee. It should be noted that the capacitor 302 may not be limited to a metal capacitor, and other types of capacitors are applicable as well. In another configuration, the system 300 may include an additional capacitor 302 connected outside of the die 330. Such a capacitor is also charged by the energy harvested by the harvester 301.

The PMU 303 is coupled to the capacitor 302 and is configured to regulate the power to the microcontroller 304 and SoC 305. Specifically, as the capacitance of the capacitor 302 is very limited, the power consumption should be carefully maintained. This maintenance is performed to avoid draining of the capacitor 302, thus resetting the microcontroller 304. The PMU 230 can be realized using a Schmitt trigger that operates on a predefined threshold ($V_{ref}$), e.g., $V_{ref}$=0.85V.

In another embodiment, the PMU 303 may be further configured to provide multi-level voltage level indications to the microcontroller 304. Such indications allow the microcontroller 304 to determine the state of a voltage supply at any given moment when the capacitor 302 charges or discharges. According to this embodiment, the PMU 303 may include a detection circuitry controlled by a controller. The detection circuitry includes different voltage reference threshold detectors, where only a subset of such detectors are active at a given time to perform the detection. The controller determines which sub-set of detectors are activated at any given moment. An example implementation of a multi-level PMU 220 is discussed in U.S. Provisional application Ser. No. 16/176,460 to Yehezkely, assigned to the common assignee.

The low-energy communication system 300 does not include any crystal oscillator providing a reference clock signal. According to an embodiment, the reference clock signal is generated using over-the-air signals received from the antenna 310. As noted above, in a typical deployment, a free running oscillator is locked via a phase-locked loop (PLL) to a clock, originating from a crystal oscillator. According to the disclosed embodiments, the OCC 305-A calibrates the frequency of an oscillator using an over-the-air reference signal. The oscillator(s) implemented in the system 300 are on-die oscillators and may be realized as a digitally controlled oscillator (DCO).

The retention memory 306 is a centralized area in the communication system 100 that is constantly powered. Data to be retained during low power states is located in the retention memory 140. In an embodiment, the retention area is optimized to subthreshold or near threshold voltage, e.g., 0.3V-0.4V. This allows for the reduction of the leakage of the retention cells.

Figure 4:
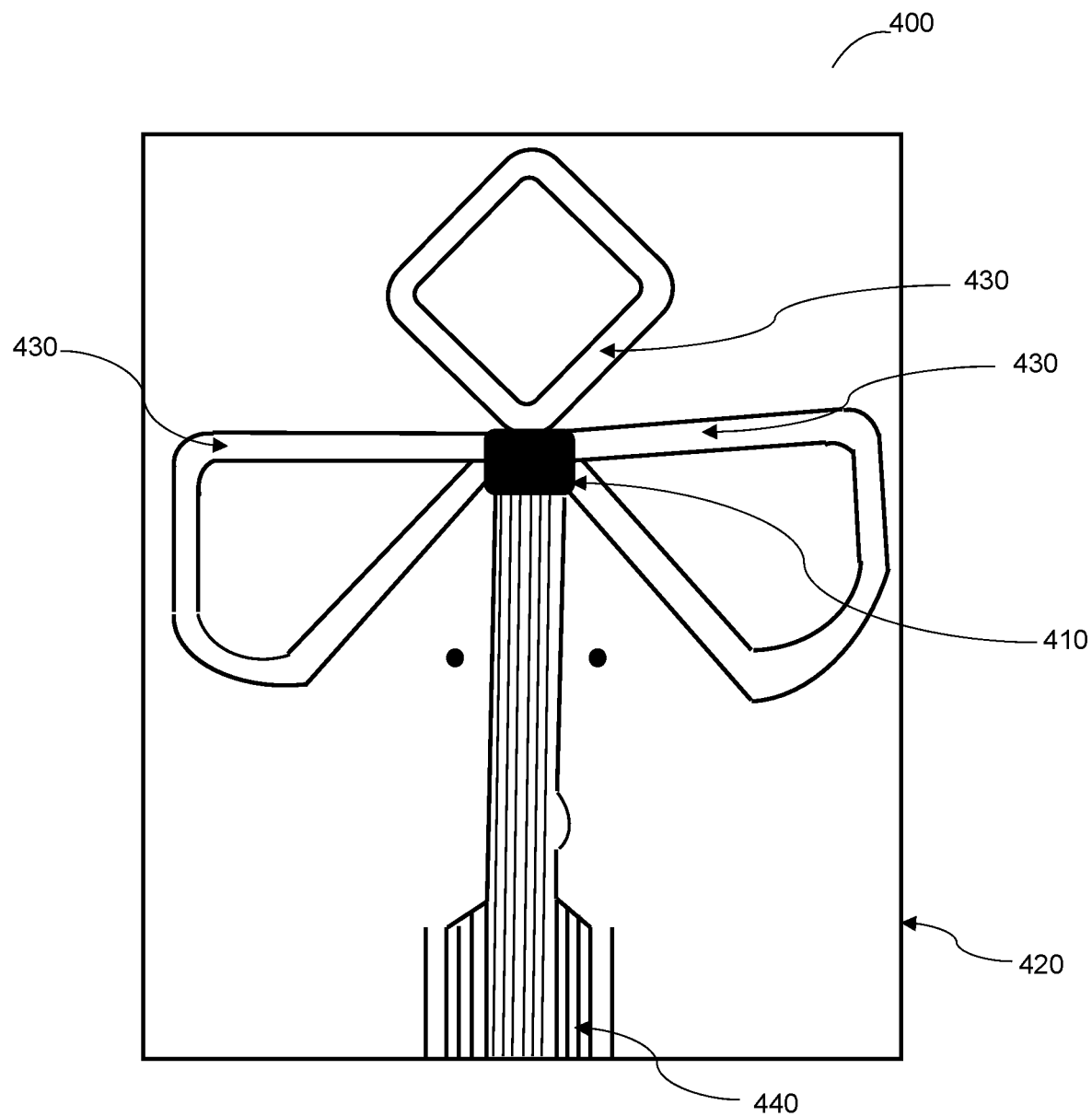
FIGS. 4 and 5 are pictures of on-die package less low-energy communication system designed according to the disclosed embodiments.

FIG. 4 shows an example picture 400 of the low-energy communication system designed according to the disclosed embodiments. The picture 400 demonstrates a die 410, placed on a substrate 420. In this example, the substrate 420 is made of polyethylene (PET), polyimide (PI) and polystyrene (PS) material.

On the substrate 420 there are three etched loop antennas 430 530. Each of these antennas may serve for energy harvesting and/or receiving/transmitting wireless signals. Further, each antenna 430 may operate at different frequency band.

Electrical connections to the die 410 are achieved through bumps 440. The bumps 440 may be electroless bumps, with copper pillars and gold stud bumps. This further allows reduction of the overall cost of the system. It should be noted that the antenna's shape is not limited to the shape shown in FIG. 4. The antenna may be designed with a different shape or layout depending, for example, on the frequency band.

Figure 5:
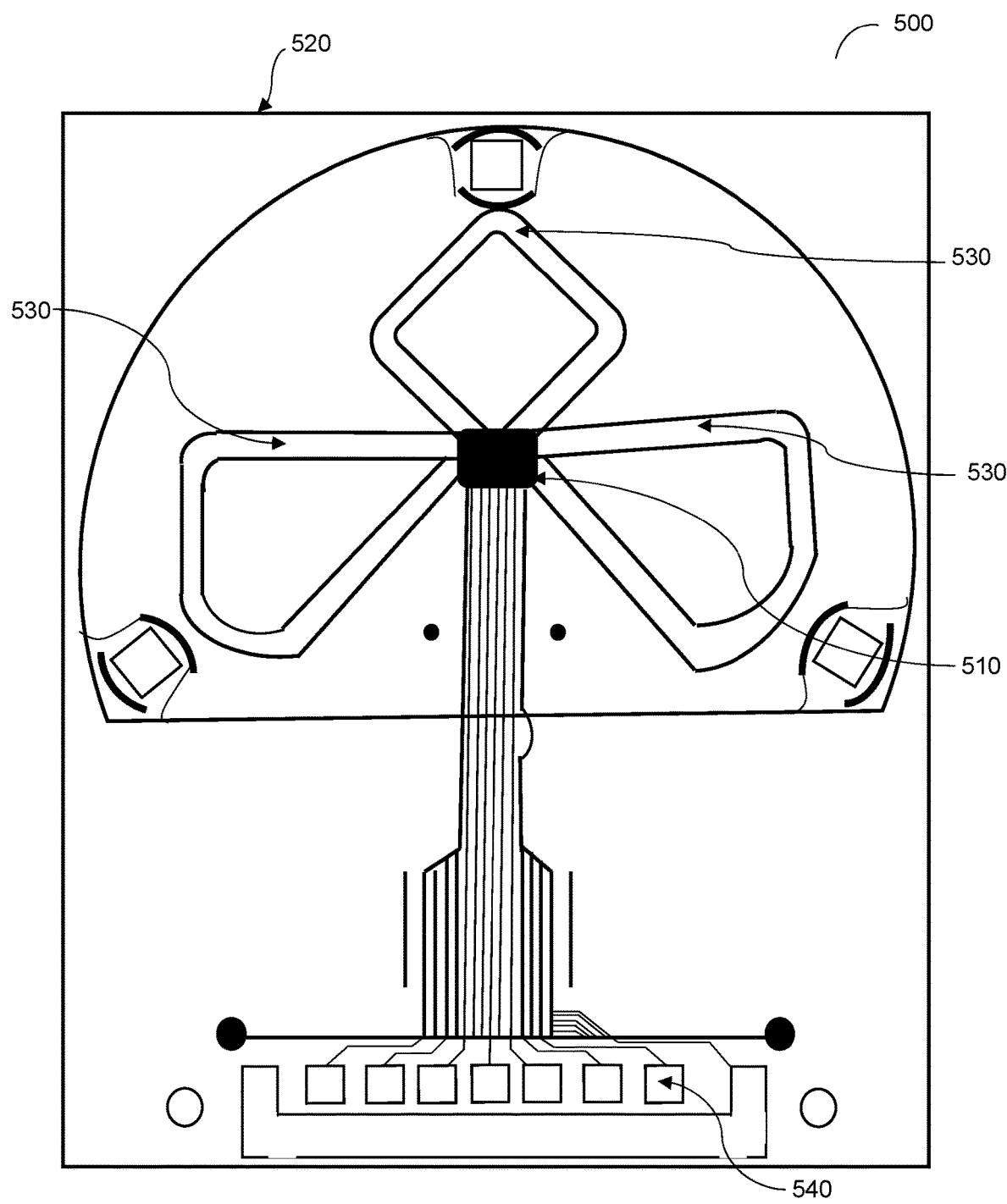

As another example, FIG. 5 shows a picture of a different configuration of the low-energy communication system designed according to the disclosed embodiments.

The picture 500 demonstrates a die 510, placed on a substrate 520. In this example, the substrate 520 is made of low-cost material, such as polyethylene (PET), polyimide (PI), and polystyrene (PS). On the substrate 520 there are four etched loop antennas 530. Each of these antennas may serve for energy harvesting and/or receiving/transmitting wireless signals. Further, each antenna 530 may operate at different frequency band. Electrical connections to the die 510 are achieved through bumps 540.

It should be appreciated that the form factor of the low-energy communication system disclosed herein allows manufacture and mass-produced low-cost and ultra-low-power IoT devices (or tags). Such devices can be attached, for example, to consumer goods, such as shoes, clothing, bottles (wine, cosmetics, etc.), objects (such as, sunglasses, watches, etc.), and the likes.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can also be utilized. For example, if a system is described as including "at least one of A, B, and C," the system can include A alone; B alone; C alone; A and B in combination; B and C in combination; A and C in combination; or A, B, and C in combination.

What is claimed is:

1. A low-energy communication system, comprising:
   at least one antenna;
   an energy harvester coupled to the at least one antenna and adapted to harvest energy from the at least one antenna that is generated by over-the-air signals impinging upon the at least one antenna;
   a first capacitor for storing the harvested energy; and
   a system on chip (SoC) for allowing at least reception and transmission of wireless signals using a low-energy communication protocol; and
   wherein the energy harvester, the first capacitor, the SoC, are integrated in a semiconductor die, the die is placed on a substrate;
   wherein the at least one antenna is included in the substrate;
   wherein the at least one antenna is also employed for at least one of the reception and transmission of wireless signals using a low-energy communication protocol; and
   the low-energy communication system further comprising a second capacitor connected to the energy harvester and integrated on the substrate outside of the die that is adapted to also store energy harvested by the energy harvester.

2. The system of claim 1, further comprising:
   a microcontroller configured to control processes performed by the SoC; and
   a power management unit configured to regulate the power to the microcontroller; and SoC; wherein the microcontroller and the power management unit are included in the die.

3. The system of claim 1, wherein the die is package-less.

4. The system of claim 1, wherein the substrate is made of any one of: polyethylene (PET) material, polyimide (PI) material, and polystyrene (PS) material.

5. The system of claim 1, wherein the die is glued to the substrate using at least conductive material.

6. The system of claim 1, wherein the at least one antenna is glued to substrate using at least conductive material.

7. The system of claim 1, wherein the low-energy communication protocol is at least a Bluetooth low energy.

8. The system of claim 1, wherein the system does not include any crystal oscillator, and wherein a reference clock signal is generated using the over-the-air signals.

9. The system of claim 1, further comprising:
   a sensor integrated on the substrate.

10. The system of claim 1, further comprising at least a second antenna for at least energy harvesting, and wherein at least one of the first at least one antenna and the at least second antenna is a loop antenna that substantially encloses in a plane at least the energy harvester and at least one of the at least one antenna and the at least second antenna.

11. A battery-free internet of things (IoT) device, comprising:
   a die integrating functionality of a low-energy communication system, wherein the die is integrated on a substrate;
   at least one antenna connected to the die, wherein the at least one antenna is included on the substrate;
   wherein the die further comprises:
      an energy harvester coupled to the at least one antenna and adapted to harvest energy generated by the antenna from the over-the-air signals;
      a first capacitor for storing the harvested energy; and
      a system on chip (SoC) for allowing at least reception and transmission of wireless signals using a low-energy communication protocol;
   a sensor included on the substrate;
   a second capacitor connected to the energy harvester and integrated on the substrate outside of the die that is adapted to also store energy harvested by the energy harvester;
   wherein the at least one antenna is employed for harvesting energy from over-the-air signals impinging upon the at least one antenna and also for at least one of the reception and transmission of wireless signals using a low-energy communication protocol.

12. The IoT device of claim 11, wherein the die further includes:
   a microcontroller configured to control processes performed by the SoC; and
   a power management unit configured to regulate the power to the microcontroller; and SoC.

13. The IoT device of claim 11, further comprising:
   a second capacitor connected to the energy harvester and integrated on the substrate outside of the die.

14. The IoT device of claim 11, wherein the die is package-less.

15. The IoT device of claim 11, wherein the substrate is made of polyethylene (PET) material, polyimide (PI) material, and polystyrene (PS) material.

16. The system of claim 11, further comprising at least a second antenna for at least energy harvesting, and wherein at least one of the at least one antenna and the at least second antenna is a loop antenna that substantially encloses in a plane at least the energy harvester and at least one of the at least one antenna and the at least second antenna.

* * * * *